(12) United States Patent
Gorbatov et al.

(10) Patent No.: US 9,195,285 B2
(45) Date of Patent: Nov. 24, 2015

(54) TECHNIQUES FOR PLATFORM DUTY CYCLING

(71) Applicant: Intel Corporation, Santa Clara, CA (US)

(72) Inventors: Eugene Gorbatov, Hillsboro, OR (US); Paul S. Diefenbaugh, Portland, OR (US); Andrew D. Henroid, Portland, OR (US); Guy M. Therien, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 116 days.

(21) Appl. No.: 13/728,335

(22) Filed: Dec. 27, 2012

(65) Prior Publication Data

US 2014/0189398 A1 Jul. 3, 2014

(51) Int. Cl.
*G06F 1/32* (2006.01)
*G06F 1/20* (2006.01)

(52) U.S. Cl.
CPC ............ *G06F 1/206* (2013.01); *G06F 1/3203* (2013.01); *G06F 1/324* (2013.01); *Y02B 60/1217* (2013.01); *Y02B 60/1275* (2013.01); *Y02B 60/32* (2013.01)

(58) Field of Classification Search
None
See application file for complete search history.

(56) References Cited

U.S. PATENT DOCUMENTS

| 7,739,527 | B2 | 6/2010 | Rothman et al. | |
|---|---|---|---|---|
| 8,176,341 | B2 | 5/2012 | Jeyaseelan et al. | |
| 8,856,566 | B1 * | 10/2014 | Jane | 713/320 |
| 2006/0136767 | A1 * | 6/2006 | Ma | 713/324 |
| 2007/0086160 | A1 * | 4/2007 | Wang | 361/690 |
| 2008/0141265 | A1 | 6/2008 | Choi | |
| 2011/0213508 | A1 | 9/2011 | Mandagere et al. | |
| 2012/0166839 | A1 * | 6/2012 | Sodhi et al. | 713/322 |

OTHER PUBLICATIONS

International Search Report and Written opinion received for PCT patent Application No. PCT/US2013/048427, mailed Sep. 27, 2013, 9 pages.

* cited by examiner

*Primary Examiner* — Paul Yanchus, III
(74) *Attorney, Agent, or Firm* — Kacvinsky Daisak Bluni PLLC

(57) ABSTRACT

Various embodiments are generally directed to an apparatus, method and other techniques for detecting active and semi-active workloads during execution on a platform processing device and enabling a duty cycle process to reduce thermal output and power consumption, and align unaligned activity. In various embodiments, the duty cycle processing may be enabled during an active workload when thermal output or power consumption is above a thermal threshold or power consumption threshold that is below an efficient operating point for the platform processing device. The duty cycle processing may also be enabled during semi-active workloads when the workload causes the platform processing device to be underutilized and unaligned. The duty cycle processing may comprise enabling a forced idle period for the platform processing device. Other embodiments are described and claimed.

28 Claims, 9 Drawing Sheets

600

DETECT AN ACTIVE OR SEMI-ACTIVE WORKLOAD FOR EXECUTION ON A PLATFORM PROCESSING DEVICE, THE WORKLOAD DETECTED BASED UPON ONE OR MORE CRITERIA
*602*

ENABLE DUTY CYCLE PROCESSING FOR THE PLATFORM PROCESSING DEVICE BASED UPON AN ACTIVE OR SEMI-ACTIVE WORKLOAD DETECTED
*604*

DETERMINE A THROTTLING THRESHOLD COMPRISING AN OPTIMAL PLATFORM LEVEL SLEEP STATE FOR A FORCED IDLE PERIOD
652

ENABLE THE FORCED IDLE PERIOD FOR THE PLATFORM PROCESSING DEVICE, THE FORCED IDLE PERIOD TO DEFER ACTIVITY
654

ENABLE AN ACTIVE PERIOD TO SERVICE THE DEFERRED ACTIVITY AFTER THE FORCED IDLE PERIOD
656

*FIG. 6B*

TECHNIQUES FOR PLATFORM DUTY CYCLING

BACKGROUND

Many platform processing devices including system-on-chip (SoC) devices require high performance capacity during active workloads, such as processing three-dimensional (3D) gaming applications. During active workloads, these platform processing devices may output a substantial amount of thermal energy and consume a substantial amount of power. While in some circumstances the higher thermal energy output and power consumption may be acceptable, many of these platform processing devices operate in an environment where they may be power and thermal limited. For example, these platform processing devices may operate in a mobile device, such as in a mobile phone, tablet or wearable computers, where a high thermal output and power consumption is undesirable.

In addition, these platform processing devices are at a disadvantage and pay a disproportionately large performance tax while running semi-active workloads, such as processing causal gaming applications and Internet applications. Many semi-active workloads do not benefit in improved quality or responsiveness from this higher performance capacity. As a result, the higher performance capacity of these platform processing devices may become a significant impairment under semi-active workloads. Consequently, there exists a substantial need for techniques to reduce power consumption and thermal output during active and semi-active workloads without impacting the platform processing device's performance capacity when fully active. It is with respect to these and other considerations that the embodiments described herein are needed.

BRIEF DESCRIPTION OF THE DRAWINGS

FIG. 6A illustrates an embodiment of a second logic flow.

FIG. 6B illustrates an embodiment of a third logic flow.

DETAILED DESCRIPTION

Figure 1:
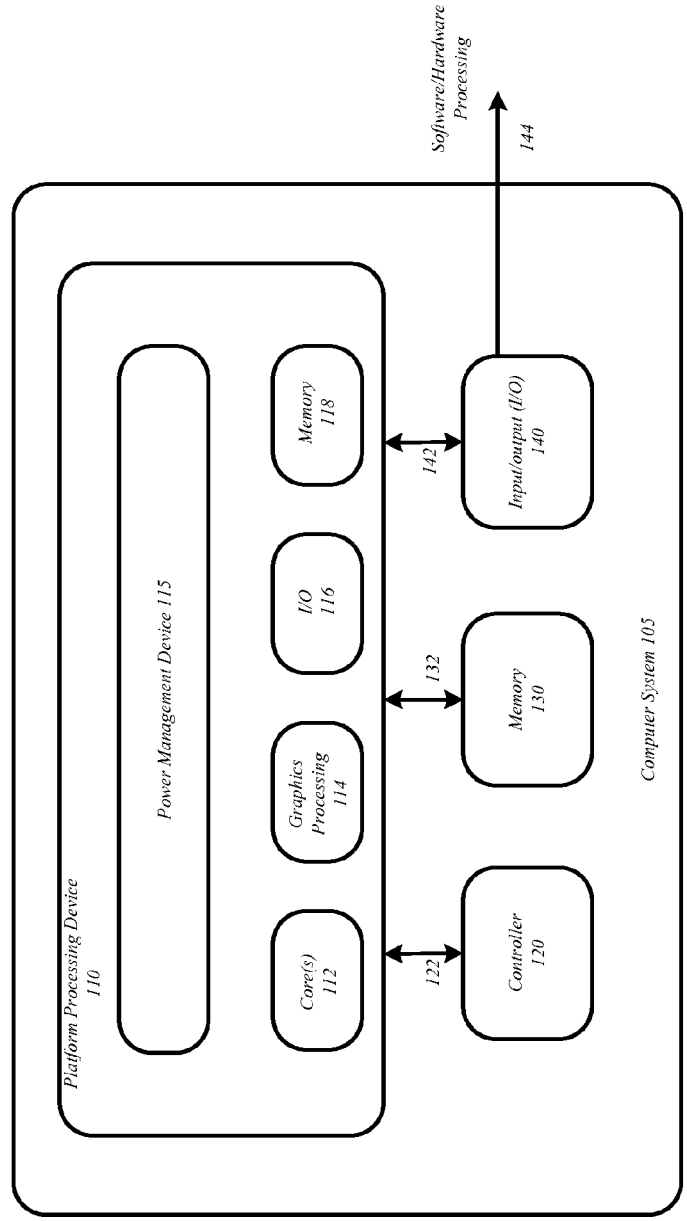
FIG. 1 illustrates an embodiment of a first system.

Various embodiments are generally directed to an apparatus, method and other techniques for managing workloads on an electronic device. Some embodiments are particularly directed to detecting active and semi-active workloads during execution on a platform processing device and enabling a duty cycle process to reduce thermal output and power consumption, and align unaligned activity. In various embodiments, the duty cycle process may be implemented simultaneously at the platform level of a platform processing device. Forcing the entire platform processing device at the platform level to enter the idle period may be advantageous over a component-wise approach of prior systems by further reducing power consumption and thermal output for the platform processing device. In addition, the platform level approach may be advantageous over the component-wise approach by eliminating the need to enable/disable idle periods for individual components or sub-systems in a piece-meal fashion.

In various embodiments, duty cycle processing may be enabled during an active workload when thermal output or power consumption is above a thermal threshold or power consumption threshold that would otherwise cause processing to occur below an efficient operating point for the platform processing device. The duty cycle processing may also be enabled during semi-active workloads when the workload causes activity on the platform processing device to be underutilized and unaligned. The duty cycle processing may comprise enabling a forced idle period for the platform processing device, and in the case of semi-active processing the unaligned activity may be forcibly aligned for execution on the platform processing device through the use of the forced active and idle periods. During active workloads, when the platform processing device is operating at or above an efficient operating point a forced idle period may be enabled to achieve a target average power consumption output. Other embodiments are described and claimed.

The duty cycle processing techniques described herein address the short-comings of previous platform processing devices. For example, enhanced duty cycle processing techniques may utilize a fine-grain, device and software transparent model where processing activity at the platform level may be forced into idle periods for very short time periods. These short time periods may be on the order of hundreds or even tens of microseconds. In some embodiments, enabling duty cycle processing during active workloads more efficiently scales power and performance versus alternatives such as frequency scaling by maintaining a target average power level while maintaining power consumption and thermal output below acceptable limits. This target average power level may be maintained with duty cycle processing based on power consumed during active periods and during idle periods As previously stated, platform processing devices are at a disadvantage and pay a disproportionately large performance tax while running semi-active workloads, such as processing causal gaming applications and Internet applications. The greater performance capacity for these platform processing devices comes in part from a larger and more power consuming uncore, path to memory, and interconnects, for example. Using current platform processing device solutions, when a platform processing device becomes even slightly active, such as processing direct memory access (DMA) and/or interrupts, the platform processing device consumes a large amount of power and outputs a large amount of thermal energy.

In various embodiments, duty cycle processing during semi-active workloads forcibly aligns unaligned activity by forcing activity across a platform into idle periods during underutilized processing periods. Unaligned activity occurs naturally and frequently when processing most workloads. For example, unaligned activity may occur when unaligned independent threads are processed across multiple processing cores. In another example, unaligned activity may occur when input/output (I/O) activity is generated at times irrespective of computational processing. Unaligned activity may also occur when general processing cores and graphic processing cores process activity in a non-overlapping times. Enabling duty cycle processing during semi-active workloads and while the platform processing device is being underutilized forces alignment of previously unaligned activity. In addition the forcibly aligning activity across the platform processing device to enter a platform idle state can cause the computer system to operate at a lower power level, thermal level and at a higher operational efficiency.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an embodiment of an exemplary computer system 105 suitable for implementing various embodiments described herein. In various embodiments, the computer system 105 comprises a platform processing device 110, a controller 120, a memory device 130 and an input/output (I/O) device 140. The platform processing device 110 may be any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The platform processing device 110 may be connected to and communicate with the controller 120, the memory device 130, and the I/O device 140 via interconnects 122, 132 and 142, respectively. Moreover, the controller 120, the memory device 130, and the I/O device 140 may communicate with all of the components of the platform processing device 110.

While not limited in this respect, the platform processing device 110 may comprise a power management device 115, one or more processing cores 112, a graphics processing unit 114, a platform I/O device 116, a platform memory device 118 and any other uncore (non-core) components (not shown). Uncore components may include other memory, caches, pipelines, I/O devices and controllers. In some embodiments, the platform processing device 110 may have more than two processing cores, for example. The one more processing cores 112 may have more than one processing unit. The one or more processing cores 112 include, but are not limited to, pre-fetch logic to fetch instructions, decode logic to decode the instructions, execution logic to execute instructions and the like.

In some embodiments, the platform processing device 110 comprises a graphics processing unit 114. The graphics processing unit 114 may function as an adjunct processor that manages graphics and/or video operations and/or processing.

The platform processing device 110 comprises a platform I/O device 116 and platform memory device 118 in some embodiments. The platform I/O device 116 provides an external interface for the platform processing device 110 to other devices within computer system 105. In addition, the platform memory device 118 stores instructions and/or data of the platform processing device 110, and in particular, the one or more processing cores 112. The platform memory device 118 may also store temporary variables or other intermediate information while the platform processing device 110 and the one or more processing cores 112 are executing instructions. In another embodiment, the platform memory device 118 includes, but is not limited to, level one (L1), level two (L2) and level three (L3) cache memory or any other configuration of the cache memory within the platform processing device 110. The processing cores 112, the graphics processing unit 114, the platform I/O device 116 and platform memory device 118 may communicate with each other via interconnects (not shown).

The power management device 115 may be operative to control the duty cycle processing comprising forced idle periods, active periods, average power consumption and alignment of software and hardware activity, including but not limited to I/O activity in various embodiments. For example, in one embodiment, the power management device 115 may enable the duty cycle process and forcibly align software and hardware activity across the platform processing device 110 by forcing the platform processing device 110 to enter a forced idle period at a throttling threshold. The power management device 115 may forcibly align activity when the power management device 115 detects that hardware and/or software activity is unaligned and hardware components of the platform processing device 110 are underutilized. In some embodiments, during a forced idle period, the platform processing device 110 is placed into an idle period and does not actively processing hardware and software activity. The platform processing device 110 may be placed into the idle period across the entire platform of the device including the components such as the one or more processing cores 112, the graphics processing unit 114, the platform I/O device 116, the platform memory device 118, and any other uncore components. In another embodiment, the platform processing device 110 may process activity essential to the operation of the computer device 105. In other embodiments, the platform processing device 110 may process some, but not all software and hardware activity based upon the throttling threshold.

In various embodiments, the power management device 115 may enable the duty cycle process when power consumption and/or thermal output are above respective predetermined thresholds. In one embodiment, the power management device 115 may achieve a target average power for the platform processing device 110 by enabling forced idle periods and active periods during duty cycle processing. These embodiments are described below in more detail with respect to FIG. 2.

In some embodiments, the power management device 115 may force the platform processing device 110 to enter the idle period at the component and/or sub-system level. In various embodiments, the power management device 115 may force the entire platform processing device 110 to enter the idle period, including all the components and sub-systems of the platform processing device 110 at the platform level. Forcing the entire platform processing device 110 at the platform level to enter the idle period may be advantageous over the component-wise approach of prior systems by further reducing power consumption and thermal output for the platform processing device 110 and computer system 105 while maintaining hardware and software processing expectations, for example latency tolerances. In addition, the platform level approach may be advantageous over the component-wise approach by eliminating the need to enable/disable idle periods for individual components in a piece-meal fashion. In some embodiments, the power management device may be external from the platform processing device 110. The power management device 115 and duty cycle process are described in more detail below.

The controller 120 may include a microcontroller or other type of processing circuitry, memory and interface logic. In some embodiments, the controller 120 may monitor and control operation of the computer system 105 including, but not limited, monitoring and controlling operation of the memory device 130 and the I/O device 140. The controller 120 may also monitor and control various aspects of the platform processing device 110, including but not limited to, communication between various components of the computer system 105 and the platform processing device 110. In various embodiments, the controller may be coupled with the platform processing device 110 via interconnect 122.

The memory device 130 stores instructions and/or data of the computer system 105. The memory device 130 may also store temporary variables or other intermediate information while the computer system 105 is executing instructions. The I/O device 140 is the interface between the computer system 105 and an external system or device. The I/O device 140 may communicate with the external system or device via a connection 144. Connection 144 may be wired or wireless or any other means known to one skilled in the art. In one embodiment, the I/O device 140 may communicate with the platform processing device 110 via interconnect 142 through the platform I/O device 116. The power management device 115, the memory device 130 and the I/O device 140 may also communicate with each other via interconnects (not shown).

The components illustrated in the computer system 105 are not meant to be limiting and are presented for purposes of illustration. In other embodiments, the configuration of the computer system 105 includes other (more or less) components than shown in FIG. 1. One of ordinary skill in the relevant art will appreciate that other configurations of the computer system 105 can be used without affecting the workings of the embodiments described herein.

Figure 2A:
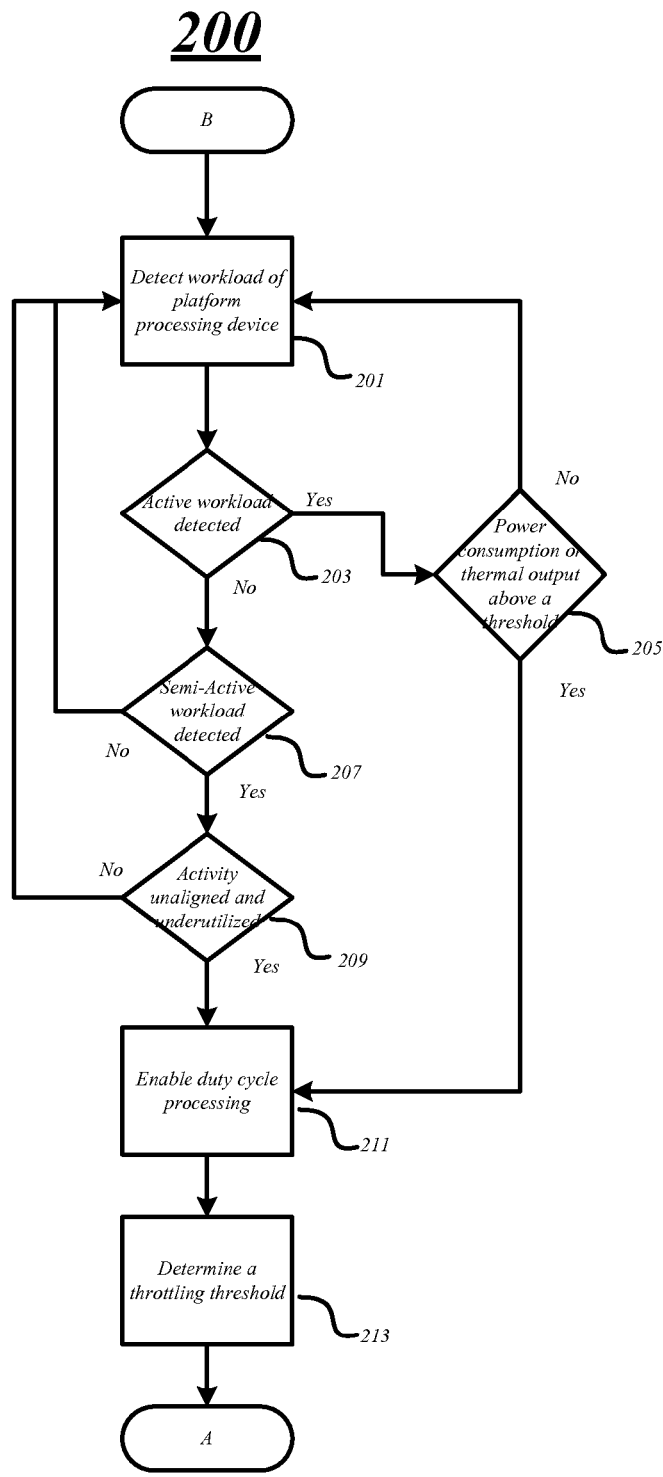
FIG. 2A illustrate an embodiment of a first logic flow.
Figure 2B:
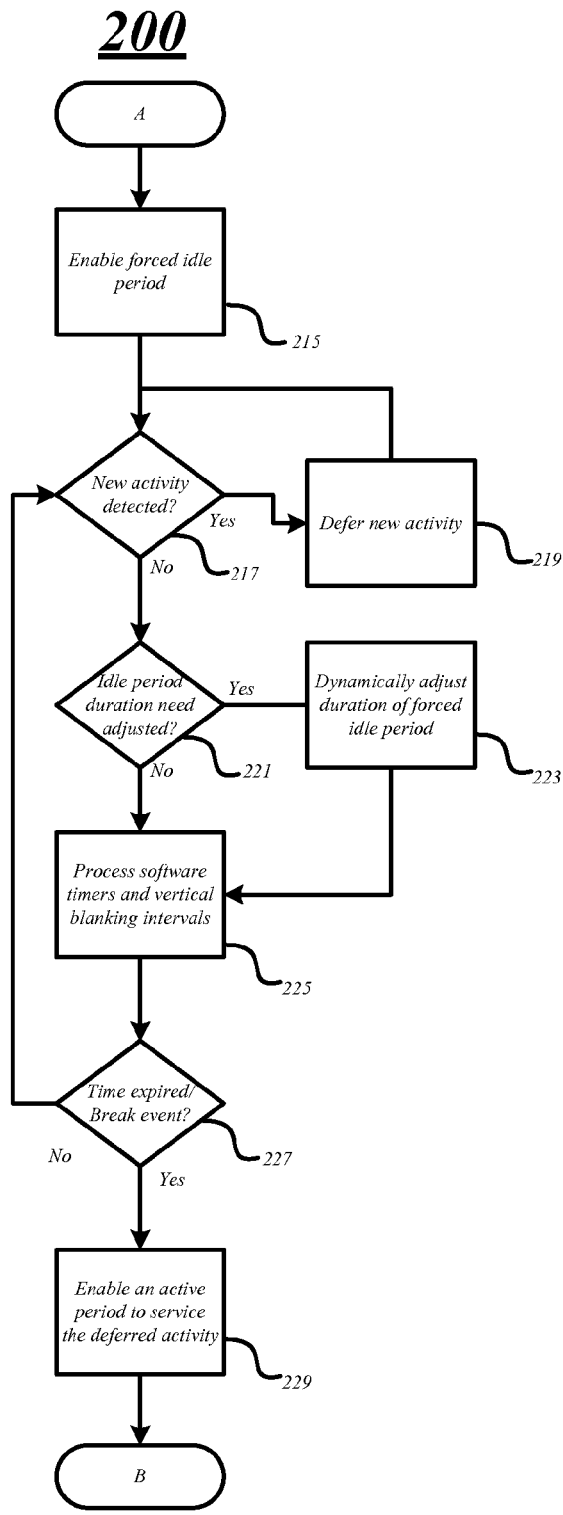
FIG. 2B illustrate a continuation of the embodiment of a first logic flow.

FIGS. 2A/2B comprise a logic flow diagram illustrating one example of a duty cycle process and control thereof in accordance with some embodiments. For clarity purposes, the logic flow is discussed with reference to the computer system 105 of FIG. 1. At block 201, a workload of a platform processing device is determined. The workload may be determined based upon one or more criteria, including but not limited to, a processing percentage of one of more cores 112, a graphics processing percentage of a graphics processing unit 114, I/O activity of a platform processing I/O 116, and read/write activity of a platform memory 118. At decision block 203, it is determined if an active workload is detected for the platform processing device 110. The active workload may be determined based upon one or more of the above-recited criteria being above a respective threshold. For example, the power management device 115 may determine that the processing percentage of the one or more cores 112 is above a processing threshold.

If it is determined at decision block 203 that an active workload is detected, then power consumption and thermal output may be determined at decision block 205. If the power consumption or thermal output is above a power threshold or thermal threshold, respectively, the power management device 115 enables duty cycle processing. The power management device 115 may enable duty cycle processing at the platform or sub-component level for the platform processing device 110. If the power consumption and thermal output are below a power threshold and thermal threshold, respectively, the power management device 115 continues to detect the workload of the platform processing device 115.

At decision block 203, if it is determined that an active workload is not detected, the power management device 110 determines if a semi-active workload is detected at decision block 207. The semi-active workload may be determined based upon one or more of the above-recited criteria being below a threshold. For example, the power management device 115 may determine that the processing percentage of the one or more cores 112 is below a processing threshold. In some embodiments, the one or more criteria may be higher or above a first threshold to determine an active workload. The one or more criteria may lower or below a second threshold to determine a semi-active workload. In various embodiments, the first threshold may be higher or above the second threshold or the first threshold and the second threshold may be the same threshold.

If a semi-active workload is detected for a platform processing device 110, the power management device 115 may determine if the platform processing device 110 is underutilized and unaligned at decision block 209. The platform processing device 110 may be underutilized when the platform processing device 110 is operating below a threshold. In some embodiments, the platform processing device underutilization determination may be based upon the semi-active workload determination. For example, underutilization may be based upon a processing percentage of one of more cores, a processing percentage of a graphics processing unit, I/O activity of a platform processing I/O, and read/write activity of a platform memory. In some embodiments, underutilization requires all of the components of the platform processing device 110 to be underutilized. For example, the one or more cores 112, the graphics processing unit 114, the platform processing I/O 116 and the platform memory 118 may be underutilized. Underutilization of the platform processing device 110 may be based upon the most active component of the platform processing device 110. For example, if the one or more cores 112 are processing at 30%, the graphics processing unit 114 is processing at 25%, the platform I/O device 116 is processing at 20% and the platform memory device 118 is operating at 25%, the determination of underutilization is based upon the one or more cores 112 processing at 30%, the most active component.

In various embodiments, the power management device 115 determines when the platform processing device 110 is unaligned. The platform processing device 110 may be unaligned when one or more of the platform processing device components are not processing data, hardware activity, software activity, and/or hardware and software activity concurrently, but during different time periods. For example, in various embodiments, the one or more cores 112 and the graphics processing unit 114 or any of the other components may process hardware and software activity in different time periods. Thus, when the various components of the platform processing device 110 process during different time periods, the platform processing device 110 is typically active and processing hardware and software activity.

Hardware and software activity may also be unaligned when hardware components of the computer system are processing or computing computations irrespective of software processing or computing. As described above, unaligned activity may occur when unaligned independent threads are processed across multiple processing cores. In another example, unaligned activity may occur when input/output activity is generated at times irrespective of computational processing. Unaligned activity may also occur when general processing cores and graphic processing cores process activity in a non-sequential or sequential manner. In some embodiments, duty cycle processing is not required and not enabled when the hardware and software activity is aligned. In one embodiment, the duty cycle processing may only be enabled when software and hardware activity is unaligned.

When it is determined that an active and semi-active workload are not detected, the power management device 115 continues to dynamically monitor and determine when an active workload or semi-active workload is detected. For example, the power management device 115 continues to monitor the workload of the platform processing device 110. At block 211, duty cycle processing is enabled to achieve reduction in power consumption and thermal output while the platform processing device 110 is processing in an active workload or semi-active workload. In various embodiments, alignment of hardware and software activity may also be achieved while in the semi-active workload. Duty cycle processing during semi-active workloads, while enabled, will be software and hardware transparent and unnoticeable to an operator of the computer system 105.

At block 213, a throttling threshold comprising an optimal platform level idle state for a forced idle period is determined for the platform processing device 110 based on one or more of the workload determination previously described, platform and component latency tolerance requirements, platform idle state entry and exit times, an amount hardware and software activity, and an average power consumption goal. In some embodiments, the optimal platform level idle state may be different and based upon different requirements for active and semi-active workloads. For example, an average power consumption goal is used for determining the optimal platform level idle state during active workloads and not semi-active workloads.

The optimal platform idle state may be one of a lightweight platform idle state, a deep platform idle state and a deepest platform idle state. The platform level idle state describes the amount of power applied to or consumed by the platform processing device including the processing cores and the amount of information that is saved in memory, cache and registers. For example, when the throttling threshold is set to the lightweight platform idle state all hardware and processing cores maintain power and context or information is maintained, but the platform processing device 110 consumes less power than when in a fully active state. In another example, when the throttling threshold is set to the deep platform idle state the processing cores 112 lose power and the processor cores, hardware, cache and chipset context or information are preserved using memory. Moreover, the system memory is retained. When the throttling threshold is set to the deepest platform idle state, the system consumes the least power compared to all other idle states. In the above embodiment, three idle states are described, however, the system is not limited to three idle states as one skilled in the art will readily understand.

In various embodiments, a platform and component latency tolerance requirement may be used to determine the optimal platform idle state under both active and semi-active workloads. In various embodiments, the platform latency tolerance may be based at least in part on the maximum latency the platform processing device 110 may tolerate without adversely affecting its performance. The platform latency tolerance may refer to the to the current maximum latency tolerance of all the components or sub-systems/devices within the platform. In other embodiments, the latency tolerance may be based upon individual latency tolerances for components. The latency tolerance of a component may be based at least in part on the delay the component may tolerate without adversely affecting its performance, when the component and/or other components of the system transition from a platform idle mode to a normal/execution state. The platform latency tolerance may also be based at least in part on internal and external components including buffering limitations of the internal and external components and coordination of component-level buffering.

In some embodiments, a deeper platform idle state may be entered when latency tolerance requirements have a longer time requirement and are more forgiving. Deeper platform idle states generally require more time to enter and exit because of the state the various components are in while in this deeper idle state. The platform processing device 110 may enter the deeper platform idle state, when the latency tolerance requirements of the platform processing device 110 components are longer because more time is allowed for the platform processing device 110 to maintain, enter and exit the deeper platform idle state.

Similarly, in some embodiments, platform idle state entry and exit time requirements may also be used to determine the throttling threshold at the optimal platform idle state. Various components of the computer system 105 and platform processing device 110 may require faster or, in the alternative, permit slower entry and exit times. As previously stated, typically as the platform idle states get deeper, entry and exit times are longer. Thus, system and platform processing components requiring faster entry and exit times may not be able enter into deeper platform idle states. Conversely, when platform idle state entry and exit time requirements are slower, the optimal platform idle state may be set to a deeper idle state.

In some embodiments, an amount of hardware and software activity may be used to determine the optimal platform idle state. For example, in one embodiment, the lightweight platform idle state is entered when software activity is detected. In the same embodiment, a deep platform idle state is entered if no software activity is detected during a detection of the activity level or software activity ceases during the forced idle period. The deepest platform idle state is entered if no hardware and software activity is detected during the detection of the activity level. The detection of the activity level occurs while the duty cycle processing is enabled and may occur during an active period or a forced idle period. The activity level detected during an active period may determine the optimal idle for the next forced idle period. The activity level detected during a forced idle may change the optimal idle state or the optimal idle state may be maintained. For example, if software activity ceases while in a forced idle period, the optimal idle state may change from a lightweight idle to a deep idle state if software activity ceases during the forced idle period.

In some embodiments, during active workload duty cycle processing, an average power consumption goal may be used to determine the throttling threshold at optimal platform idle state for the platform processing device 110. In various embodiments, the power management device 115 may utilize a running average power limit (RAPL) to control power consumption and thermal output by the platform processing device 110 in a coordinated manner. RAPL may be used to determine an optimal platform idle state available and throttling threshold for the platform processing device 110. For a given window of time, RAPL may be calculated to keep available power within an average power consumption goal based upon a received power usage. For example, a target average power level of 1.5 W may be achieved by processing during the active state at 2.5 W and residing at 0.5 W during the idle period 50% of the time. The appropriate optimal platform idle state is based upon this determination to keep the available power within an average power consumption goal.

In some embodiments, a time length of the forced idle period of the optimal platform idle state is determined while determining the throttling threshold. For example, in some embodiments, the time length of the forced idle period may be longer for deeper platform idle states than lightweight platform idle states. In one embodiment, the forced idle period may have a shorter time length when the throttling threshold is set to the lightweight platform idle state compared to the deep or the deepest platform idle state. In another embodiment, the forced idle period may have a longer time period when the throttling threshold is set to the deep platform idle state compared to the lightweight platform idle state, but a shorter time length compared to the deepest platform idle state. The forced idle period may have the longest time length when the throttling threshold is set to the deepest platform idle state.

In some embodiments, the time length of the forced idle period may not be based upon the throttling threshold, but on other system parameters. For example, the time length may be determined to ensure software transparency as described above. In one embodiment, for example during semi-active workloads, the time length of the forced idle period may be based upon the latency tolerance setting or requirement and outstanding activity. For example, in some embodiments, the latency tolerance requirements may be set such that the computer system 105, platform processing device 110 and components will not be adversely affected by the forced idle period and the optimal platform level idle state. Some components of the computer system 105 and platform processing device 110 may require a longer amount of response time coming out of the platform idle state, as previously discussed. Thus, in these cases, a shorter time length of the forced idle period may be required. In some embodiments, the time length of the forced idle period may depend on both the throttling threshold, optimal platform idle state and the other system parameters.

The time length of the forced idle period may also be based upon critical events, such as software timers and vertical blanking intervals. The critical events may require processing within a particular time period. The critical events may be analyzed before entry into the forced idle period while software and hardware is actively processing and the time length or the expiration of the forced idle period may be based upon this analysis. The time length based upon these analyses may also be used to determine the optimal platform idle state. For example, the optimal platform idle state may be one of a lightweight idle state when the critical events require a shorter forced idle period and a deep or deeper idle state when the critical events permit a longer forced idle period.

In various embodiments, during semi-active workloads, the time length of the forced idle period may be based upon I/O buffering abilities of the computer system 105, platform processing device 110 and components. The I/O buffering abilities of attached devices may also be used to determine a latency tolerance of the device and the time length of forced idle period in some embodiments. For example, particular components of the computer system or platform processing device may have limited and static I/O buffering abilities and require frequent I/O buffering reads or writes to prevent I/O buffer overflows or underflows. These limited I/O buffering abilities may determine or be used to base the time length of the forced idle period.

In some embodiments, the time length of the active period and forced idle period may be based upon a race-to-halt policy implemented on the platform processing device 110. For example, the one or more processing cores 112 may run faster during an active or compressed active state. Running the one or more processing cores 112 at a faster rate allows the processing cores 112 to complete more tasks and process more work over a shorter period of time during the active state. When the race-to-halt policy is implemented and the processing cores 112 are run at a faster rate and the time length of the forced idle period may be longer than when a race-to-halt policy is not implemented. In some embodiments, the race-to-halt policy may allow the throttling threshold to be set at a deeper optimal platform idle state.

In some embodiments, during semi-active workloads, the time length of the forced idle period may be used to achieve an optimal ratio of forced idle period time to active period time based upon the semi-active workload's observed performance capacity need and potentially dynamically limited by I/O buffering abilities and latency tolerance requirements. For example, the power management device 110 may determine that the component requiring the maximum processing activity time is active 30% of the time. Thus, the potential maximum forced idle period may be idle 70% of the time. The time length of the forced idle time then may be determined to achieve this 70% idle to 30% active ratio. However, as previously discussed, latency tolerance requirements and I/O buffering abilities may limit the potential maximum forced idle time to some percentage less than 70% idle.

At block 215 a forced idle period is enabled for the platform processing device 110. During the forced idle period, software and hardware activity is deferred until the next active period. In various embodiments, the hardware and software activity processed by the one or more cores 112 is deferred until the next active period. The hardware and software activity may include graphic and non-graphic processing. In various embodiments, during the forced idle period the entire platform processing device 110 including the one or more cores 112, the graphics processing unit 114, the platform I/O device 116 and the platform memory 118 any other uncore (non-core) components (not shown) may enter an optimal platform idle state. Uncore components may include other memory, caches, pipelines, I/O devices and controllers. The components and platform processing device 110 would not otherwise enter optimal idle state during normal operation. The forced idle period may also occur at a fine granularity level to preserve software transparency. In some embodiments, software transparency is preserved when software processing is unaffected by the forced idle period and is not noticeable to an operator of the system.

In various embodiments, latency tolerance reporting (LTR), uncore frequency scaling (UFS) and core power down (CPD) may be implemented to enable the forced idle period. LTR may be used to enable the forced idle period on the platform processing device 110 by aligning device dynamic memory address (DMA) and interrupts. UFS provides a mechanism to flush and halt uncore I/O activity thereby holding off activity between the one or more cores 112. CPD provides a similar mechanism for the one or more processing cores 112 to flush and halt activity at the core level. The platform processing device 110 may enter one of the platform idle states, as described above, during a forced idle period by using at least one of LTR, UFS and CPD and halting activity.

At block 217, the system determines if new activity is generated during the forced idle period. When activity is generated during the forced idle period, the activity is also deferred until the next active period at block 219. New activity may be any hardware or software activity generated during the forced idle period. This activity may include interrupts, timers, vertical blanking intervals, clock inputs, etc.; however, the system is not limited to these examples as one skilled in the art will readily understand.

At block 221, the time length of the forced idle period is evaluated and a determination is made whether to dynamically adjust the time length based upon at least one of a latency tolerance setting, arrival of non-deferment events, and outstanding activity. The time length of the forced idle period may be adjusted to a longer or shorter time based upon the determination made. For example, if the latency tolerance of the system or component is shorter than the time length of the forced idle period, the forced idle period may be shortened. In another example, the arrival of non-deferment events may determine the time length of the forced idle period. In some embodiments, some events may require processing while the platform processing device 110 and computer system 105 are in the forced idle period. Thus, the time length of the forced idle period may be shortened to accommodate the requirements of these non-deferment events. In another example, outstanding activity may not be processed before the platform processing device 110 enters the forced idle period. This unprocessed activity may require processing sooner than originally expected forcing an adjustment to the time length of the forced idle period. At block 223, the time length of the forced idle period is adjusted when the determination to dynamically adjust the time length has been made. In some embodiments, the time length of the forced idle period may be extended up to the platform latency tolerance.

At block 225, certain software and hardware activity processing may be required during the forced idle period. For example, certain events such as software timers and vertical blanking intervals may be required to be processed before the next active period and during the forced idle period. This activity may be newly generated activity determined at block 217 or activity originally deferred. The embodiments described herein are not limited to only processing software timers and vertical blanking intervals during the forced idle period. The system may process any software and hardware activity required to maintain the system in a proper state and to properly process data while in the forced idle period.

At block 227, a determination is made as to whether the forced idle period has expired based upon the time length of the forced idle period or a reason to break the forced idle period prematurely. If the forced idle period has not expired, the system remains in the forced idle period and continues to determine if new activity is being generated, the time length of the forced idle period needs adjustment, and processing required software and hardware activity. The forced idle period may be prematurely ended, i.e. before the normal time length expired, due to the occurrence of a break event. For example, a break event may be a device memory access (DMA) requiring processing, one or more device interrupts requiring processing, or the occurrence of a critical event such as a software timer or vertical blanking interval. However, the embodiments are not limited in this manner, other break events may also occur.

At block 229, an active period is enabled to service the deferred activity. In one embodiment, the power management device 115 enables an active period for the platform processing device 110. For example, in some embodiments, the platform processing device 110 processes any activity deferred during the forced idle period and newly generated activity during the active period. This activity may be hardware and software activity.

Figure 3:
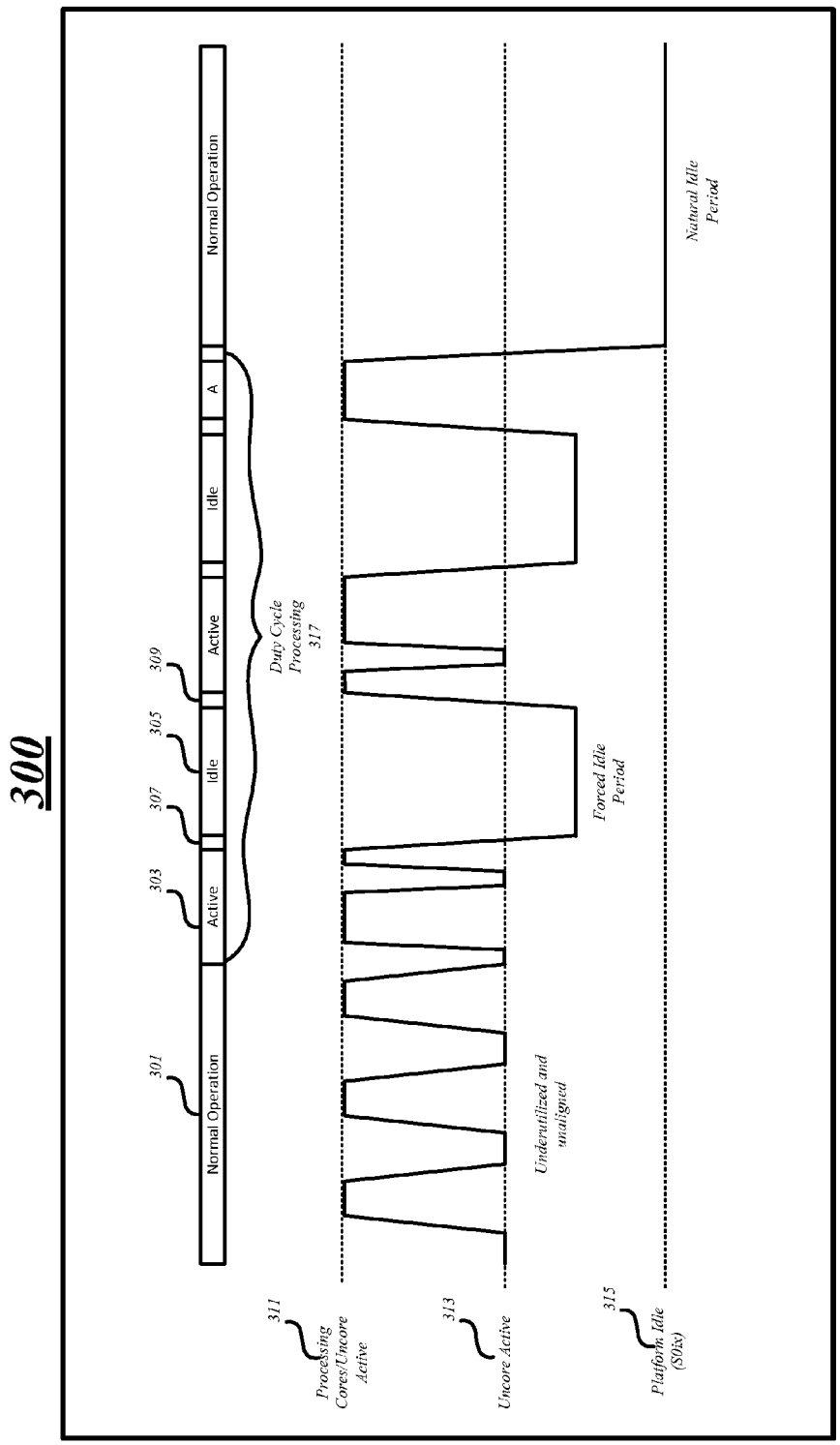
FIG. 3 illustrates an embodiment of a first activity level diagram.

FIG. 3 illustrates an embodiment of a first activity level diagram 300 for the platform processing device 110. The activity level diagram illustrates various hardware and software activity levels during various operational periods. The activity level diagram comprises normal operational periods 301, active operational periods 303 and forced idle periods 305. A normal operational period 301 occurs when duty cycle processing is not enabled and may have periods of time when hardware and/or software activity is more active than other periods of time as shown in FIG. 3. Active operational periods 303 and forced idle period 305 occur when duty cycle processing is enabled. As previously described, duty cycle processing may be enabled when active and semi-active workloads are detected.

The activity level diagram 300 illustrates entry periods 307 and exit periods 309. An entry period 307 is a period of time when a transition to a forced idle period is occurring and an exit period is a period of time when a transition from an idle period is occurring. In some embodiments, both an entry 307 and exit period 309 have a time length that may vary and may be less than ten microseconds. In other embodiments, both the entry 307 and exit period 309 may have a time length that varies and is more than ten microseconds. In some embodiments, as previously described, these entry and exit periods may be used to determine the optimal platform idle state during a forced idle period.

The activity level diagram 300 defines three levels of activity, fully active level 311, uncore active level 313 and platform natural idle level 315. When activity is at the fully active level 311, all hardware and software activity is being processed by the processing cores, graphic processing device, platform I/O, platform memory and uncore components that are essential to the processing cores, but not part of the processing cores. When activity is at the uncore active level 313, only the uncore components are being processed. The processing cores 112 and graphic processing unit 114 are not processing activity. When activity is at the platform natural idle level 315, no activity is processed by the processing cores 112, graphic processing unit 114, and uncore components. The activity level of the platform processing device 110 does not necessarily process at one of the three levels, but may process activity at any level in between one of the three levels or at one of the three levels, as shown in FIG. 3.

FIG. 3 illustrates hardware and software activity being processed during a normal operation period 301. The hardware and software activity being processed during the normal operational period is at various activity levels including at the all active level 311 and uncore active level 313 and is under a semi-active workload. FIG. 3 illustrates the hardware devices underutilized and unaligned. Duty cycle processing may be enabled as shown as duty cycle processing period 317. During the duty cycle processing period 317, hardware and software activity may be processed at various activity levels, including the throttle levels described above with reference to FIGS. 2A/2B. The duty cycle processing period 317 may comprise active periods 303 and forced idle periods 305. The duty cycle processing may be enabled and disabled any number of times based upon whether a semi-active workload is detected, and the hardware devices are underutilized and activity is unaligned.

With respect to FIG. 3, the duty cycle processing ceases and a second normal operational period 301 is shown. During the second normal operational period 301, hardware and software activity is at the platform natural idle level 315. In various embodiments, the duty cycle processing may cease when at least one of the following events occur, the hardware and software activity becomes aligned, the hardware devices are not underutilized and a semi-active workload is not detected. However, the duty cycle processing may also cease for other reasons known to one skilled in the art.

Figure 4:
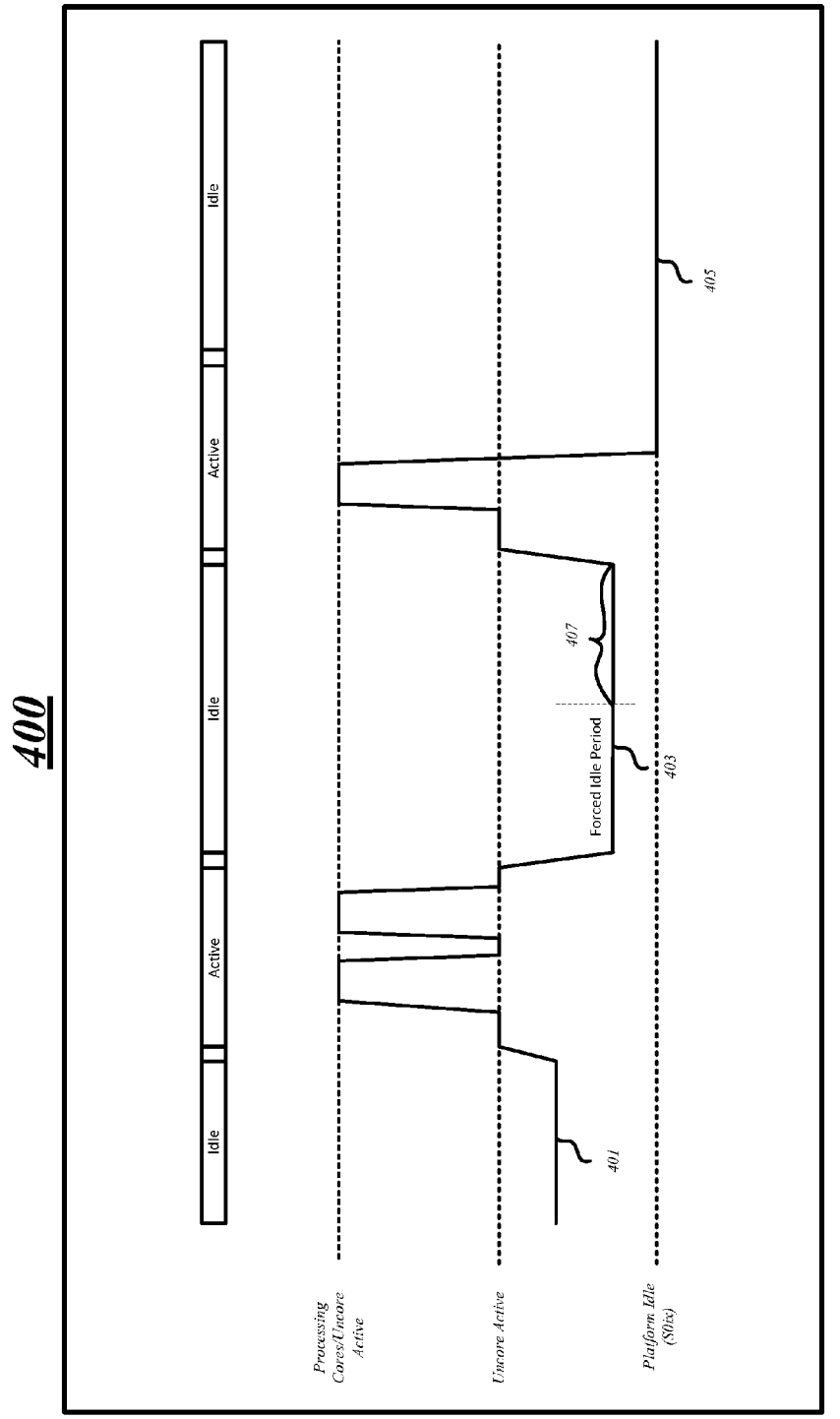
FIG. 4 illustrates an embodiment of a second activity level diagram.

FIG. 4 illustrates an embodiment of a second activity level diagram 400 for the platform processing device 110. Hardware and software activity level diagram 400 illustrates duty cycle processing for platform processing device 110. Similar to FIG. 3, hardware and software activity level diagram 400 illustrates forced idle periods and active periods for processing activity. Diagram 400 also illustrates three activity levels including a fully active level, uncore active level and SoC natural idle level. The hardware and software activity level diagram 400 further illustrates activity levels at different platform idle states including lightweight platform idle state 401, deep platform idle state 403 and deepest platform idle state 405. These three platform idle states are similar to those discussed above with respect to FIGS. 2A/2B.

During the lightweight platform idle state 401 all hardware and processing cores maintain power and context or information is maintained, but the system consumes less power than when in a fully active state. During the deep platform idle state 403 the processing cores lose power and the processor cores, hardware, cache and chipset context or information are lost. However, the system memory is retained. Further, during the deepest platform idle state 405, the system consumes the least amount of power compared to all other idle states. The context data or information may be written to a hard drive (disk) and there is no context retained.

In various embodiments, each of the forced idle periods may have different time lengths. As described above, the time length of the platform idle states may depend on various factors including, but not limited to which optimal platform idle state the forced idle period is in during the forced idle period. As described with reference to FIGS. 2A/2B, the lightweight platform idle state may have the shortest forced idle period, the deep platform idle state may have a longer forced idle period, and the deepest platform idle state may have the longest forced idle period. In one embodiment, a forced delay 407 may be incorporated to extend the time length of the forced idle period. The forced delay 407 may be any time length to extend the forced idle period up to the platform latency tolerance requirements. FIG. 4 illustrates the forced delay 407 being applied to a forced idle period while the throttling threshold is set to a deep platform idle state. However, the embodiments are not limited in this manner, and the forced delay 407 may be applied to any of the forced idle periods in any of the idle states.

Figure 5:
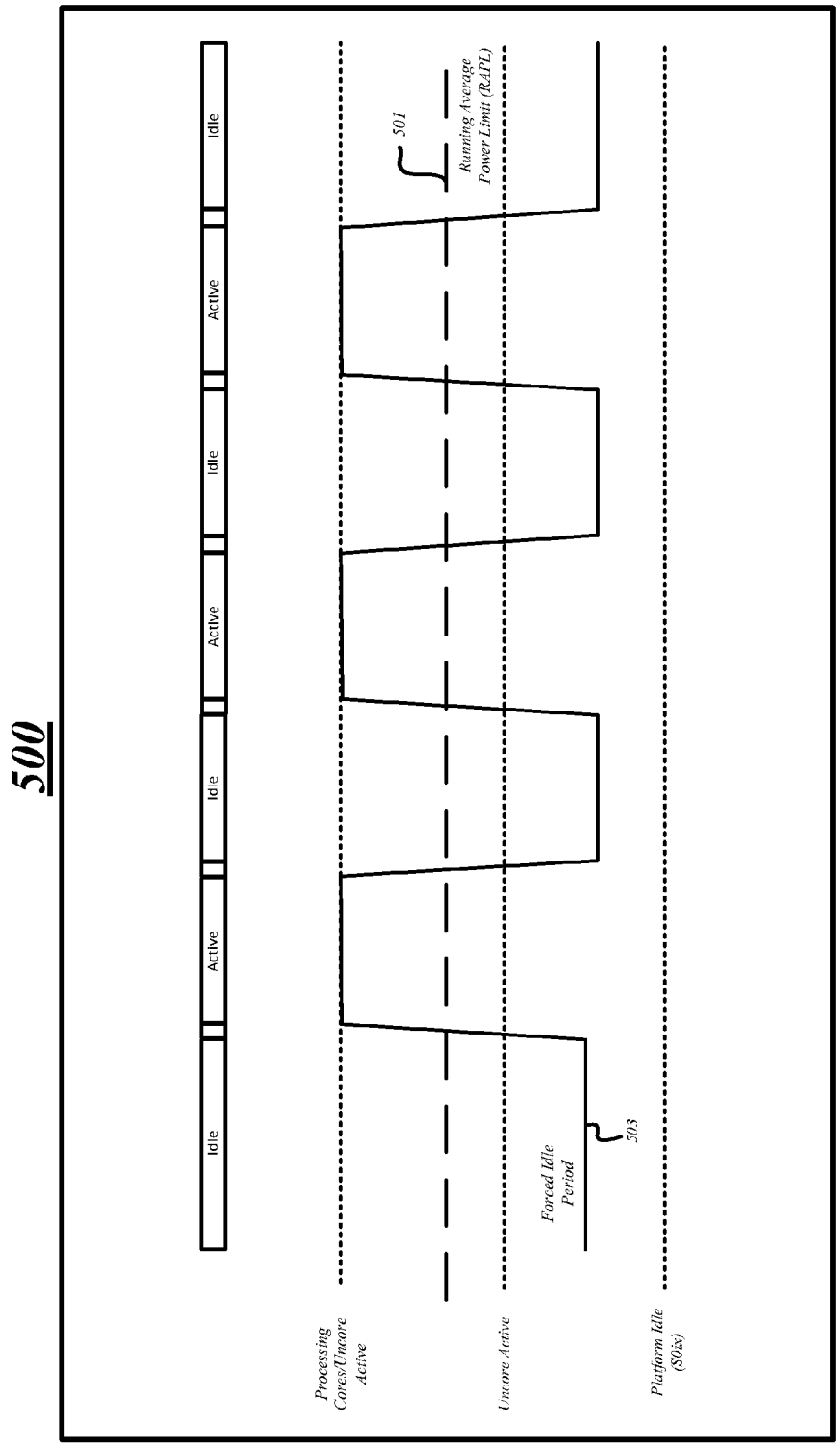
FIG. 5 illustrates an embodiment of a third activity level diagram.

FIG. 5 illustrates an embodiment of a third activity level diagram 500 and the use of duty cycle processing during an active workload. In various embodiments, the power management device 115 may utilize a running average power limit (RAPL) to control power consumption and thermal output by the platform processing device 110 in a coordinated manner. RAPL may be used to determine an optimal platform idle state available and throttling threshold for the platform processing device 110. For a given window of time, RAPL may be calculated to keep available power within an average power usage based upon a received power usage. The appropriate optimal platform idle state is based upon this determination to keep the available power within an average power usage.

With respect to FIG. 5, RAPL 501 keeps the available power within an average power usage of 50% and the throttling threshold is set at lightweight platform idle state during forced idle period 503. However, as described above, RAPL 501 may be configured to keep the available power within any average power usage to achieve a desired power consumption and thermal output reduction. In the above example, a 30% SoC device 110 power reduction is achieved.

FIG. 6A illustrates one embodiment of a second logic flow 600. The logic flow 600 may be representative of some or all of the operations executed by one or more embodiments described herein. For example, the logic flow 600 may illustrate operations performed by the system 100 and, more particularly, computer system 105 of system 100. In the illustrated embodiment shown in FIG. 6A, the logic flow 600 may include detecting an active workload or semi-active workload for execution on a platform processing device, the workload detected based upon one or more criteria at block 602. The one or more criteria may comprise a processing percentage of one of more cores, a graphics processing percentage of a graphics processing unit, I/O activity of a platform processing I/O, and read/write activity of a platform memory. The active workload may be determined based upon one or more of the above-recited criteria being above a respective threshold for each of the criteria. For example, the power management device 115 may determine that the processing percentage of the one or more cores 112 is above a processing threshold.

The semi-active workload may be determined based upon one or more of the above-recited criteria being below a respective threshold for each of the one or more criteria. For example, the power management device 115 may determine that the processing percentage of the one or more cores 112 is below a processing threshold. In some embodiments, the one or more criteria may be higher or above a first threshold to determine an active workload. The one or more criteria may lower or below a second threshold to determine a semi-active workload. In various embodiments, the first threshold may be higher or above the second threshold or the first threshold and the second threshold may be the same threshold.

At 604, in some embodiments, the power management device 115 may enable duty cycle processing for the platform processing device based upon an active or semi-active workload. For example, duty cycle processing may be enabled during a semi-active workload based upon whether activity is unaligned and the platform processing device is underutilized. In another example, duty cycle processing may be enabled during an active workload when power consumption or thermal output is above a threshold. In some embodiments, enabling duty cycle processing during a semi-active workload forcibly aligns activity into a fine-grain forced idle and active periods at the platform processing device level. In another embodiment, enabling duty cycle processing during an active workload enables the computer system to achieve power consumption and thermal output efficiency gains by maintaining an RAPL at an average power goal.

FIG. 6B illustrates one embodiment of a third logic flow 650. The logic flow 650 may be representative of some or all of the operations executed by one or more embodiments described herein. For example, the logic flow 650 may illustrate operations performed by the system 100 and, more particularly, computer system 105 of system 100.

In the illustrated embodiment shown in FIG. 6B, the logic flow 650 may include duty cycle processing to determine a throttling threshold comprising an optimal platform level idle state for a forced idle period at block 652. At block 654 a forced idle period is enabled for the platform processing device 110. During the forced idle period, software and hardware activity is deferred until the next active period. For example, the hardware and software activity processed by the one or more cores 112 is deferred until the next active period. In various embodiments, during the forced idle period the entire platform processing device 110 may enter a power managed device idle state. The forced idle period may occur at a fine granularity level to preserve software transparency.

At block 656, in various embodiments, an active period to service the deferred activity after the forced idle period is enabled. For example, the power management device 115 may enable an active period to process hardware and software activity deferred during the forced idle period. The power management device 115 may enable an active period after the forced idle period time period has expired or initiated by another event.

Figure 7:
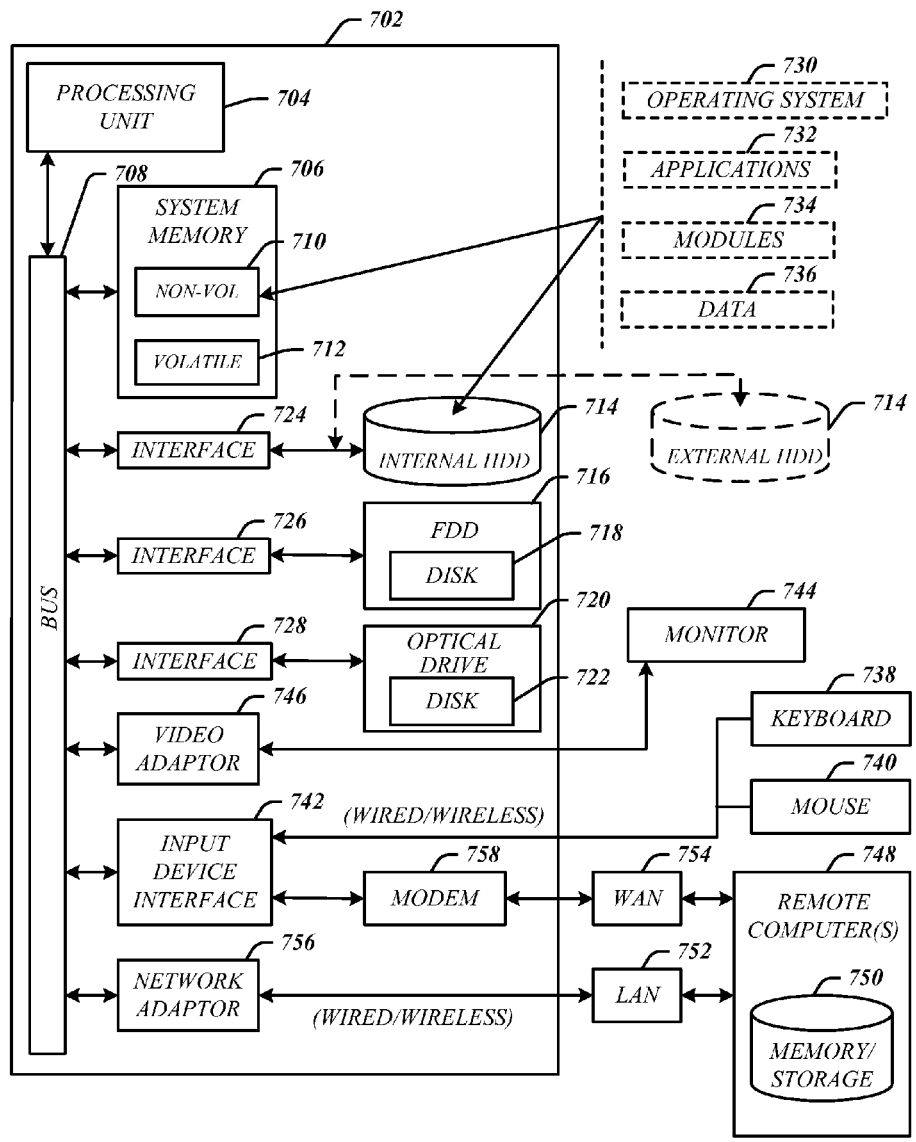
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of wristband 110 and/or computing device 115.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, such as those described with reference to the processor 130 shown in FIG. 1.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the touch gesture recognition system 100 as previously described with reference to FIGS. 1-7 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty (1-30) provided below are intended to be exemplary and non-limiting.

In a first example, a platform processing device may comprise logic, at least a portion of which is in hardware, the logic to enable duty cycle processing for the platform processing device, determine a platform level idle state for a forced idle period, and enable the forced idle period for the platform processing device, the forced idle period to defer activity and cause one or more components of the platform processing device to enter the platform level idle state.

In a second example, the platform processing device may comprise logic to duty cycle processing in response to a detection of active or semi-active workloads.

In a third example, the platform processing may comprise logic to defer new activity generated during the idle period until the active period is enabled.

In a fourth example, the platform processing may comprise logic to force all components of the platform process device to enter an idle or low power state.

In a fifth example, the platform processing may comprise logic to dynamically adjust a time length of the forced idle period based upon at least one of a latency tolerance setting, arrival of non-deferment events, and outstanding activity.

In a sixth example, the platform processing may comprise logic to process activity at a faster rate during an active period to increase a time length of the forced idle period.

In a seventh example, the platform processing may comprise logic to process software timers and vertical blanking intervals (VBIs) during the forced idle period.

In an eighth example, the platform processing may comprise logic to determine underutilization of the platform processing device and unaligned activity, in response to the detection of the semi-active workload and enable duty cycle processing based at least in part on the determination of underutilization and unaligned activity.

In a ninth example, the platform processing may comprise logic to determine power consumption for the platform processing device above a power threshold and thermal output for the platform processing device above a thermal threshold, in response to the detection of the active workload, and enable the duty cycle processing based at least in part on the determination of power consumption and thermal output.

In a tenth example, the platform processing may comprise logic to enable an active period to service the deferred activity after the forced idle period.

In an eleventh example, an article may comprise a computer-readable storage medium containing a plurality of instructions that when executed enable a platform processing device to enable duty cycle processing for the platform processing device. The article may comprise instructions that when executed enable the platform processing device to determine a platform level idle state for a forced idle period and enable the forced idle period for the platform processing device, the forced idle period to defer activity and cause one or more components of the platform processing device to enter the platform level idle state.

In a twelfth example, the article may comprise instructions that when executed enable a platform processing device to enable duty cycle processing in response to a detection of active or semi-active workloads.

In a thirteenth example, the article may comprise instructions that when executed enable a platform processing device to defer new activity generated during the idle period until the active period is enabled.

In a fourteenth example, the article may comprise instructions that when executed enable a platform processing device to force all components of the platform process device to enter an idle or low power state.

In a fifteenth example, the article may comprise instructions that when executed enable a platform processing device to dynamically adjust a time length of the forced idle period based upon at least one of a latency tolerance setting, arrival of non-deferment events, and outstanding activity.

In a sixteenth example, the article may comprise instructions that when executed enable a platform processing device to process activity at a faster rate during an active period to increase a time length of the forced idle period.

In a seventeenth example, the article may comprise instructions that when executed enable a platform processing device to process software timers and vertical blanking intervals (VBIs) during the forced idle period.

In an eighteenth example, the article may comprise instructions that when executed enable a platform processing device to determine underutilization of the platform processing device and unaligned activity, in response to the detection of the semi-active workload and enable duty cycle processing based at least in part on the determination of underutilization and unaligned activity.

In a nineteenth example, the article may comprise instructions that when executed enable a platform processing device determine power consumption for the platform processing device above a power threshold and thermal output for the platform processing device above a thermal threshold, in response to the detection of an active workload and enable the duty cycle processing based at least in part on the determination power consumption and thermal output.

In a twentieth example, the article may comprise instructions that when executed enable a platform processing device to enable an active period to service the deferred activity after the forced idle period.

In a twenty first example, a system may comprise a display device, a wireless device, a memory, and a platform processing device. The platform processing device to enable duty cycle processing for the platform processing device, determine a platform level idle state for a forced idle period, and enable the forced idle period for the platform processing device, the forced idle period to defer activity and cause one or more components of the platform processing device to enter the platform level idle state.

In a twenty second example, the platform processing device to detect an active workload or semi-active workload for execution on a platform processing device, the workload detected based upon one or more criteria.

In a twenty third example, the one or more criteria comprising a processing percentage of one of more cores, a graphics processing percentage of a graphics processing unit, input/output (I/O) activity of a platform processing I/O, and read/write activity of a platform memory.

In a twenty fourth example, the platform processing device to defer new activity generated during the idle period until the active period is enabled.

In a twenty fifth example, the platform processing device to force all components of the platform process device to enter an idle or low power state.

In a twenty sixth example, the platform processing device to dynamically adjust a time length of the forced idle period based upon at least one of a latency tolerance setting, arrival of non-deferment events, and outstanding activity.

In a twenty seventh example, the platform processing device to process activity at a faster rate during an active period to increase a time length of the forced idle period.

In a twenty eighth example, the platform processing device to process software timers and vertical blanking intervals (VBIs) during the forced idle period.

In a twenty ninth example, the platform processing device to determine underutilization of the platform processing device and unaligned activity, in response to the detection of the semi-active workload and enable duty cycle processing based at least in part on the determination of underutilization and unaligned activity.

In a thirtieth example, the platform processing device to determine power consumption for the platform processing device above a power threshold and thermal output for the platform processing device above a thermal threshold, in response to the detection of an active workload and enable the duty cycle processing based at least in part on the determination power consumption and thermal output.

In a thirty first example, the platform processing device to enable an active period to service the deferred activity after the forced idle period.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A platform processing device, comprising:
   logic, at least a portion of which is in hardware, the logic to:
   enable duty cycle processing for the platform processing device;
   determine a level of activity for the platform processing device;
   determine a platform level idle state for a forced idle period from a first platform level idle state and a second platform level idle state, the first platform level idle states corresponding to an idle state of a first set of components of the platform processing device and the second platform level idle state corresponding to an idle state of a second set of components of the platform processing device, the first set comprising one or more component of the platform processing device and the second set comprising the first set and an additional one or more components of the platform processing device;
   enable the forced idle period for the platform processing device, the forced idle period to defer activity and cause the first set or the second set of components of the platform processing device to enter the platform level idle state; and
   dynamically shorten a time length of the forced idle period based upon at least one of a latency tolerance setting, arrival of non-deferment events, and outstanding activity.

2. The platform processing device of claim 1, wherein the logic is to enable duty cycle processing in response to a detection of active or semi-active workloads.

3. The platform processing device of claim 1, the logic to refer to logic to defer new activity generated during the idle period until an active period is enabled.

4. The platform processing device of claim 1, the logic to force all components of the platform process device to enter the platform level idle state.

5. The platform processing device of claim 1, the logic to process activity at a faster rate during an active period to increase a time length of the forced idle period.

6. The platform processing device of claim 1, the logic to process software timers and vertical blanking intervals (VBIs) during the forced idle period.

7. The platform processing device of claim 2, the logic to:
   determine underutilization of the platform processing device and unaligned activity, in response to the detection of the semi-active workload; and
   enable duty cycle processing based at least in part on the determination of underutilization and unaligned activity.

8. The platform processing device of claim 2, the logic to:
   determine power consumption for the platform processing device above a power threshold and thermal output for the platform processing device above a thermal threshold, in response to the detection of the active workload; and
   enable the duty cycle processing based at least in part on the determination of power consumption and thermal output.

9. The platform processing device of claim 1, the logic to enable an active period to service the deferred activity after the forced idle period.

10. An article comprising a computer-readable storage medium containing a plurality of instructions that when executed enable a platform processing device to:
    enable duty cycle processing for the platform processing device;
    determine a level of activity for the platform processing device;
    determine a platform level idle state for a forced idle period from a first platform level idle state and a second platform level idle state, the first platform level idle states corresponding to an idle state of a first set of components of the platform processing device and the second platform level idle state corresponding to an idle state of a second set of components of the platform processing device, the first set comprising one or more component of the platform processing device and the second set comprising the first set and an additional one or more components of the platform processing device;

enable the forced idle period for the platform processing device, the forced idle period to defer activity and cause the first set or the second set of components of the platform processing device to enter the platform level idle state; and dynamically shorten a time length of the forced idle period based upon at least one of a latency tolerance setting, arrival of non-deferment events, and outstanding activity.

11. The article of claim 10, comprising instructions that when executed enable the platform processing device to enable duty cycle processing in response to a detection of active or semi-active workloads.

12. The article of claim 10, comprising instructions that when executed enable the platform processing device to defer new activity generated during the idle period until the active period is enabled.

13. The article of claim 10, comprising instructions that when executed enable the platform processing device to force all components of the platform process device to enter the platform level idle state.

14. The article of claim 10, comprising instructions that when executed enable the platform processing device to process activity at a faster rate during an active period to increase a time length of the forced idle period.

15. The article of claim 10, comprising instructions that when executed enable the platform processing device to process software timers and vertical blanking intervals (VBIs) during the forced idle period.

16. The article of claim 11, comprising instructions that when executed enable the platform processing device to:
   determine underutilization of the platform processing device and unaligned activity, in response to the detection of the semi-active workload; and
   enable duty cycle processing based at least in part on the determination of underutilization and unaligned activity.

17. The article of claim 11, comprising instructions that when executed enable the platform processing device to:
   determine power consumption for the platform processing device above a power threshold and thermal output for the platform processing device above a thermal threshold, in response to the detection of an active workload; and
   enable the duty cycle processing based at least in part on the determination power consumption and thermal output.

18. The article of claim 10, comprising instructions that when executed enable the platform processing device to enable an active period to service the deferred activity after the forced idle period.

19. A system comprising:
   a display device;
   a wireless device;
   a memory; and
   a platform processing device, the platform processing to:
      enable duty cycle processing for the platform processing device;
      determine a level of activity for the platform processing device;
      determine a platform level idle state for a forced idle period from a first platform level idle state and a second platform level idle state, the first platform level idle states corresponding to an idle state of a first set of components of the platform processing device and the second platform level idle state corresponding to an idle state of a second set of components of the platform processing device, the first set comprising one or more component of the platform processing device and the second set comprising the first set and an additional one or more components of the platform processing device;
      enable the forced idle period for the platform processing device, the forced
      idle period to defer activity and cause the first set or the second set of components of the platform processing device to enter the platform level idle state; and
      dynamically shorten a time length of the forced idle period based upon at least one of a latency tolerance setting, arrival of non-deferment events, and outstanding activity.

20. The system of claim 19, comprising the platform processing device to detect an active workload or semi-active workload for execution on a platform processing device, the workload detected based upon one or more criteria.

21. The system of claim 20, the one or more criteria comprising a processing percentage of one of more cores, a graphics processing percentage of a graphics processing unit, input/output (I/O) activity of a platform processing I/O, and read/write activity of a platform memory.

22. The system of claim 19, comprising the platform processing device to enable the forced idle comprising deferring new activity generated during the idle period until the active period is enabled.

23. The system of claim 19, comprising the platform processing device to enable the forced idle period comprising forcing all components of the platform process device to enter an idle or low power state.

24. The system of claim 19, comprising the platform processing device to process activity at a faster rate during an active period to increase a time length of the forced idle period.

25. The system of claim 19, comprising the platform processing device to process software timers and vertical blanking intervals (VBIs) during the forced idle period.

26. The system of claim 20, comprising the platform processing device to:
   determine underutilization of the platform processing device and unaligned activity, in response to the detection of the semi-active workload; and
   enable duty cycle processing based at least in part on the determination of underutilization and unaligned activity.

27. The system of claim 20, comprising the platform processing device to:
   determine power consumption for the platform processing device above a power threshold and thermal output for the platform processing device above a thermal threshold, in response to the detection of an active workload; and
   enable the duty cycle processing based at least in part on the determination power consumption and thermal output.

28. The system of claim 19, comprising the platform processing device to enable an active period to service the deferred activity after the forced idle period.

* * * * *